(12) United States Patent
Wensley et al.

(10) Patent No.: US 7,116,843 B1
(45) Date of Patent: Oct. 3, 2006

(54) METHOD AND SYSTEM USING NON-UNIFORM IMAGE BLOCKS FOR RAPID INTERACTIVE VIEWING OF DIGITAL IMAGES OVER A NETWORK

(75) Inventors: Paul Wensley, Sausalito, CA (US); Richard T. Minner, Carmichael, CA (US)

(73) Assignee: Quark, Inc., Denver, CO (US)

( * ) Notice: Subject to any disclaimer, the term of this patent is extended or adjusted under 35 U.S.C. 154(b) by 727 days.

(21) Appl. No.: 09/625,226

(22) Filed: Jul. 24, 2000

(51) Int. Cl.
*G06K 9/54* (2006.01)
*G06F 15/16* (2006.01)
*G06F 3/00* (2006.01)

(52) U.S. Cl. .................. 382/305; 709/203; 715/734

(58) Field of Classification Search ........... 382/178, 382/299, 305, 282; 345/501, 538, 661, 645; 358/296, 476; 709/203, 219; 715/700, 734, 715/738, 744
See application file for complete search history.

(56) References Cited

U.S. PATENT DOCUMENTS

| 4,133,152 A | 1/1979 | Penrose ................... 52/105 |
| 4,222,076 A | 9/1980 | Knowlton ................ 358/470 |
| 4,261,018 A | 4/1981 | Knowlton ................ 358/470 |
| 4,555,775 A | 11/1985 | Pike ........................ 715/790 |
| 4,622,632 A | 11/1986 | Tanimoto et al. ........... 712/11 |
| 5,263,136 A | 11/1993 | DeAguiar et al. ......... 345/538 |
| 5,282,255 A * | 1/1994 | Bovik et al. .............. 382/239 |
| 5,341,466 A | 8/1994 | Perlin et al. ............... 345/668 |
| 5,432,871 A | 7/1995 | Novik ...................... 382/232 |
| RE36,145 E | 3/1999 | DeAguiar et al. ......... 345/538 |
| 5,877,762 A * | 3/1999 | Young ...................... 715/803 |
| 5,968,120 A | 10/1999 | Guedalia .................. 709/219 |
| 6,061,733 A * | 5/2000 | Bodin et al. .............. 709/233 |

OTHER PUBLICATIONS

"Interactive Image Query System Using Progressive Transmission," by F.S. Hill, et al., Computer Graphics, annual proceedings of SIGGRAPH, the Graphics Special Interest Group of the Association for Computing Machinery, vol. 17, n.3, Aug. 1983, pp. 323-330.
"Pyramidal Parametrics," by Lance Williams, Computer Graphics, annual proceedings of SIGGRAPH, the Graphics Special Interest Group of the Association for Computing Machinery, vol. 17, n.3, Aug. 1983, pp. 1-10.
"Graphics in Overlapping Bitmap Layers," by Rob Pike, Computer Graphics, annual proceedings of SIGGRAPH, the Graphics Special Interest Group of the Association for Computing Machinery, vol. 17, n.3, Aug. 1983, pp. 331-356.

* cited by examiner

*Primary Examiner*—Kanjibhai Patel
(74) *Attorney, Agent, or Firm*—Faegre & Benson LLP (57) ABSTRACT

Apparatus and method for rapid interactive viewing of a digital image over a network. A client computer displays a view of an image. The image is originally resident on a server computer. The client computer maintains a cache, initially empty, of image blocks already obtained from the server. When the client computer is asked to render a view of a particular portion of the image at a particular resolution, it first ascertains if any image blocks in the image-block cache intersect the requested view. It then computes the residual area of the view resulting from subtracting out from the view the intersecting portions of cached image blocks, and, if the residual area is positive, downloads from the server computer a set of image blocks comprising the residual portion of the view at the given resolution.

4 Claims, 7 Drawing Sheets

METHOD AND SYSTEM USING NON-UNIFORM IMAGE BLOCKS FOR RAPID INTERACTIVE VIEWING OF DIGITAL IMAGES OVER A NETWORK

COPYRIGHT NOTICE

A portion of the disclosure recited in the specification contains material which is subject to copyright protection. Specifically, a Microfiche Appendix in accordance with 37 CFR Section 1.96 is included that lists source code instructions for a process by which the present invention is practiced in a computer system. The copyright owner has no objection to the facsimile reproduction of the specification as filed in the Patent and Trademark Office. Otherwise all copyright rights are reserved.

FIELD OF THE INVENTION

The present invention relates to interactive viewing on a client computer of digital images resident on a server computer connected to client computers by a network, and more specifically by the Internet.

BACKGROUND OF THE INVENTION

In a network of computers, such as the Internet, it is common for individual computer users to view images and documents which are not originally resident on their own computers. Such images and documents reside instead on other computer systems dedicated to the task of serving up the images and documents and delivering them to the computers of client users connected by a network. In such a network the computer that serves up images or documents is the server computer, and the computers into which users load media from the server computer are client computers.

Frequently, a user of a client computer in a network will browse many different documents and images interactively in a single computer-use session. Therefore, there is a need for systems that permit the most rapid possible interactive browsing of media over a network. Devising systems for rapid interactive browsing is complicated by the existence of at least three major components in every client-server interactive computer use session: (1) the client computer itself; (2) the network connecting the client computer to the server computer; (3) the server computer itself.

Interactive browsing of digital media can be made quicker and more responsive to the user by increasing the speed with which any of these three components operates, or by decreasing the quantity of data that the components need to process.

In the prior art for interactive server-client image-viewing systems, two significant innovations have been the storage of pyramided images on the server, and the partitioning of such images into uniform-sized tiles. Pyramided images facilitate zooming. Uniformly-tiled images facilitate quick access and delivery of image segments by the server computer.

A pyramided image is one in which the original digital image is supplemented by a succession of lower-resolution subsampled versions of the same image. Typically, each successive subsampled image has one-half the linear (row and column) resolution of its predecessor, and hence one-quarter the areal resolution of its predecessor. Typically, the chain of subsampled images continues down to a final one which is sufficiently small to be suitable for use as a thumbnail image on a computer screen. Pyramided images are particularly valuable in a server-client image-viewing system, because they mean that the client computer does not have to do any of the computational work required for image zooming; image zooming becomes, for the client computer, a matter not of computing a downsampled image but instead of requesting the appropriate downsampled image portion from the server computer and displaying it when received.

A uniformly-tiled image is one in which the image is decomposed into a uniform grid of uniformly sized, normally square, tiles. Common tile sizes are 64 rows by 64 columns, or other squares whose linear dimension is a power of two. Once an image has been decomposed into tiles, the tiles are saved in a file format such that a tile is identifiable by its offset in rows and columns (of tiles) from the image origin, which, by convention in digital imaging systems, is at the top left of the image. Storing an image in uniform-tile format greatly simplifies, facilitates, and speeds up the task of fetching an image portion, normally a rectangular window, from inside of an image. For example, in the action of panning, the user of the computer-viewing system causes a rectangular viewing window to traverse a larger, mostly unseen, image. Each time the viewing window pans to a new location, the computer system must find the requisite rectangular portion of the image from within the file and deliver it to the portion of the computer system that causes the image to be displayed. If the image is untiled, the task of finding a particular rectangular subportion of the image can be time-consuming; it can require stepping through all the pixels (picture elements) in the image up to the origin, and then to the opposite corner, of the rectangular subwindow. If, however images are uniformly tiled, the computer system software can readily identify the set of tiles minimally necessary to envelop any given subrectangle of the image, and, since the tiles are indexed by their row and column numbers, the system software can readily access them and deliver them to this display system.

An image can be both pyramided and uniformly tiled. In this case, each single resolution "layer" of the image, including the original full-resolution layer, is partitioned into image tiles of the same dimensions, for example, 64 rows by 64 columns. As the image pyramid progresses from one layer to a subsequent subsampled lower-resolution version of it, the overall size of a layer in pixels decrease by a factor of (approximately) four. ("Approximately" because of possible quantization roundoff.) But the sizes of the tiles into which the layer is partitioned stay constant. Hence the number of tiles per layer decreases by a factor of approximately four.

Uniformly-tiled images permit a computer seeking a rectangular subwindow of an image file to have random access to the minimal set of tiles required to envelop that subwindow. In order for the computer to gain random access to the tiles, it is critically important that the tiles fill a uniform regular grid over the image area rather than randomly or chaotically filling the image area. For example, the irregular area-filling tiling schemes of Roger Penrose (as described in U.S. Pat. No. 4,133,152) would not permit random access to rectangular image subportions.

Given a server computer with access to a set of pyramided, uniformly-tiled images, a uniform-tile client-server image-browsing system as practiced in the prior art, is one in which the same tiles as are resident on the server computer are transmitted over the network to client computers, where they are displayed and are perhaps also cached for later reuse.

If such a system has a caching feature, it may operate as follows. When the user of the client computer first displays an image, the client system requests from the server computer just those uniformly-shaped tiles necessary to render the newly requested portions of the image. The tiles so requested are placed in a cache, and the portions of them requisite for the current image display (cropped to the viewing window) are then displayed. The client computer's image tile cache is now seeded. Subsequently, when the user pans or zooms the image, thus causing a new portion of the image to be needed for display, the client computer (a) determines the minimal set of tiles needed to render the new image portion; (b) determines which, if any, of the requisite tiles are contained in the client computer's tile cache; (c) determines, as the residual (a)–(b) the set of tiles, if any, needed to be requested from the server; (d) requests the requisite tiles from the server; (e) on receipt of the requisite tiles from the server, adds them to the client-computer tile cache; (f) fetches from the client-computer tile cache the entire set of tiles required to render the new image portion, and causes them to the displayed, clipped to the current view window.

As image-viewing operations continue like this, data continues to be added into the client computer's tile cache. Consequently, the tile cache consumes progressively more of the client computer's memory. In order to limit the amount of memory used by the cache, procedures for systematic tile cache purging are incorporated into the client system. An upper bound for memory occupied by the cache is specified. When addition of new tiles to the client cache would cause this upper bound to be exceeded, tiles are purged from the cache. A least-recently-used tile-purging scheme is effective for determining which tiles to purge.

In the uniform-tile client-server image-viewing system described above, several of the specific operations described are facilitated by the fact that the cache maintained by the client is a regular grid of uniformly-sized tiles. In particular, the operations (a), (b), (e) and (f) described above are all made faster by the fact that the grid of tiles is uniform, so that a tile location can be immediately calculated from an image location, and tiles can be randomly accessed.

In interactive image browsing, the bottleneck to rapid image viewing in the three-part client-network-server system is almost always the network. In particular, in almost all client-network-server systems for image browsing, an analysis of the system capabilities for a typical individual client-server session will find that the speed of image browsing by an individual user on his or her client computer could not be increased by increasing the capabilities of the client or server computer unless the network were made to operate more efficiently.

In the uniform tile client server image viewing system described above, uniformly-sized tiles are used in all three components of the server-network-client system. Images are saved on the server in a uniform grid of tiles; each segment of image data transmitted over the network constitutes an identically-sized tile from the uniform grid, or a set of such tiles; the client computer's cache of image portions is a cache of a set of identically-sized tiles from the uniform grid, each of the same specification as the identically-sized tiles stored on the server computer and transmitted over the network.

However, the choice of the use of a grid of uniformly-sized tiles, though beneficial for image access efficiency on the server computer and client computers, is suboptimal for network efficiency.

The choice of a grid of uniformly-sized tiles forces the system to transmit a significant portion of unneeded pixels along with the needed pixels over the network. For example, suppose that all tiles are of size 64 rows by 64 columns. Whenever the image portion requested has height or width which is not an even multiple of 64 the height or width of the image portion actually delivered by the server computer to the client computer will have to be padded out to an even multiple of 64 in order that the image portion constitutes an exact set of tiles. Hence more pixel information than the client requires is transmitted over the network in such a system.

The choice of the grid of uniformly-sized tiles also forces the system to transmit more header information them would otherwise be the case. Each image tile will have a header specifying such things as where it lies in the image, its resolution, the unique ID of the image to which belongs, etc. Consequently, if the pixel transmission packet consists of several tiles rather than a single pixel-block, there will also be transmitted several tile headers instead of a single pixel-block header.

In summary, the choice of uniformly-sized tiles as the network transmission packet units is inefficient because of (a) padding: the transmission of extra pixels not actually needed for the client's current image display, and because of (b) excessive transmission of header information.

Thus it is desirable to provide a system and method that increases the efficiency of the network part of the client-server image-viewing system by abandoning the insistence of prior-art systems on transmitting uniformly-sized tiles over the network.

SUMMARY OF THE INVENTION

The network in a client-network-server imaging system is made more efficient by using non-uniform, optimally-sized image blocks in the network and client parts of the system. A uniform grid of tiles may still be used on the server part of the system, but is not required.

The image units requested by the client computer and transmitted by the server computer are non-uniformly-sized image blocks containing no unnecessary pixel information (thus eliminating the padding inefficiency), and with each of the non-uniformly-sized image blocks assigned the largest size practical given the client computer's imaging needs (thus mitigating the excessive transmission of header information problem). Given that the client computer is requesting non-uniformly-sized image blocks from the server, and is then receiving them back from the server, it is expeditious to have the client's cache of image data contain the exact same non-uniformly-sized image blocks received from the server.

The present invention uses optimally-sized non-uniform image blocks in the client and network parts of the client-network-server imaging system. The server computer's database of digital image may still contain pyramided, uniformly-tiled images, although neither the pyramiding nor the uniform-tiling of digital images is required by the present invention. In case the server computer's image database does contain uniformly-tiled images, the tiles in these images will differ in size and position from the custom-sized image blocks transmitted by the server to the client computer, and the server will have to perform a translation procedure to convert the former into the latter.

In summary, the present invention provides a method and system, including the transmission of non-uniform blocks from the server computer to the client computer, for rapid viewing of digital images.

There is thus provided in accordance with the preferred embodiment of the present invention a method for communicating a digital image over a network including storing a digital image on a server computer, maintaining on a client computer a cache of image blocks comprising portions of said digital image that have been downloaded from the server computer to the client computer, and, in response to a request by a user of the client computer for a given view, comprising a particular image portion at a given resolution, downloading from the server computer the optimal image portion required to render the view on the client computer.

The operations of the invention will be made clearer by the following detailed description of the preferred embodiments.

DESCRIPTION OF THE SPECIFIC EMBODIMENTS

Figure 1:
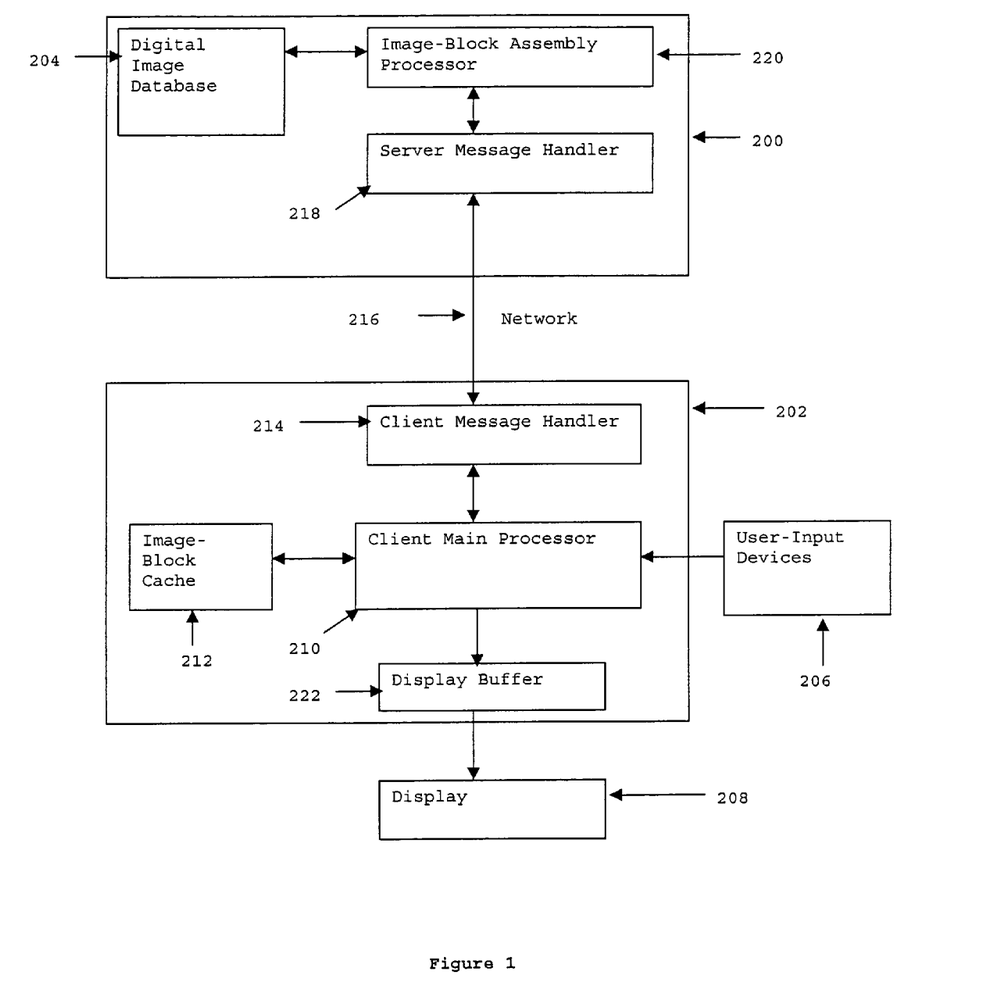
FIG. 1 is an illustration of a system and method using non-uniform image blocks for rapid viewing of digital image files over a network in accordance with a preferred embodiment of the present invention.
Figure 2:
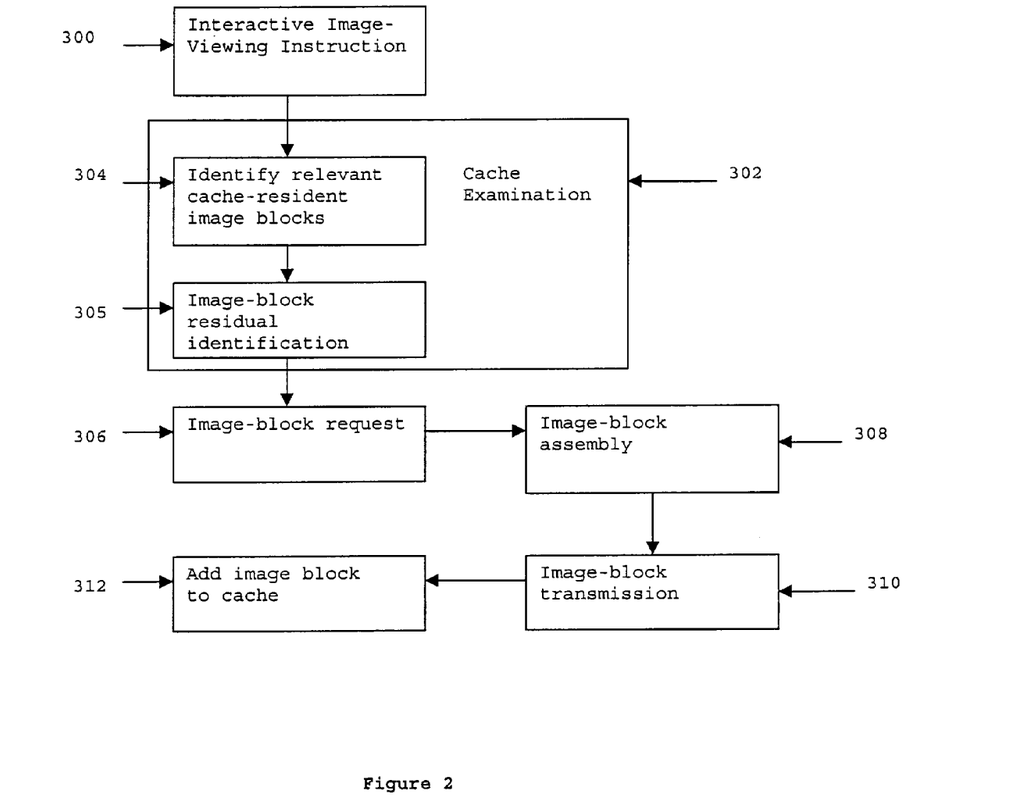
FIG. 2 illustrates a sequence of instructions and operations performed by the system and method of FIG. 1.

FIG. 1 illustrates the key components of a non-uniform image block client-server image-viewing system and method. FIG. 2 illustrates a sequence of actions that may be performed under the systems and methods of FIG. 1.

Server computer system 200 includes database 204 of digital images. Each digital image in database 204 exists in at least its primal-copy full-resolution form. This primal copy may or may not be partitioned into a uniform-tile grid, and it may or may not be supplemented by an image pyramid of downsampled lower-resolution images.

Client computer system 202 is connected to user-input devices 206, such as keyboard, mouse, microphone or trackball and to video display device 208. Client computer system 202 also includes main processor 210 which receives messages from input device 206 and communicates with other components of the client system.

A user of client computer system 202 uses user-input device 206 to send interactive image-viewing instruction 300 to client main processor 210. Image-viewing instruction 300 may be, for example, the instruction to display a rectangular subwindow or view of a particular full-resolution image known to be resident in the digital image database 204 of server 200. The particular view to be displayed under instruction 300 will be identified by its resolution (relative to the full-resolution image) and by its coordinates (relative to a view of the entire image at the indicated resolution).

After receiving view instructions 300, the client main processor 210 performs cache examination task 302. Client computer system 202 includes image-block cache 212. This consists of a combination of writable electronic memory devices, such as computer random access memory (RAM) and hard disk units (HDUs) and of software to organize a list of image blocks that have already been received by client system 202 and are resident in client memory. Cache examination task 302 consists of subtasks 304 and 305 comprising (304) the identification of relevant image blocks resident in cache 212 (these are any image blocks in the cache which intersect the requisite view) and (305) the identification of the view residual. The view residual is the portion of the view that remains after all intersecting locally-resident blocks have been subtracted out at step 304.

Using methods that will be explained subsequently (with reference to FIGS. 3–7), client processor 210 partitions the residual area of the view (if there is any residual area) into one or more non-overlapping rectangles or image-blocks.

For each such residual image block, client main processor 210 then sends a request to the client system's message handling processor 214. The client message-handling processor 214 then issues image-block request 306 over network 216 to the message handler 218 of server 200. In request 306 the requested image block is identified by its resolution (relative to the full-resolution image) and by its coordinates (relative to a view of the entire image at the indicated resolution).

Server message handler 218 passes on the image-block request 306 to the server's image-block assembly processor 220. Image-block assembler 220 then examines the server's digital image database 204 in order to carry out image-block assembly operation 308, comprising reading out of database 204 a set of pixels necessary to construct the image block specified by message 306. If the resolution specified by message 306 is full-image resolution, or if it is the resolution of a subsampled image already present in an image pyramid in database 204, the requisite pixels will be obtainable from database 204 directly. Otherwise processor 220 will have to construct the requisite pixels by downsampling from the full-resolution image.

Once image-block assembler 220 has assembled the requisite block, it instructs server message handler 218 to execute image-block transmission step 310, comprising transmitting the block over network 216 to client 202, where it is processed by client message handler 214. Client message handler 214 then informs client main processor 210 of the block's receipt, whereupon client main processor 210 executes step 312, comprising adding the image block to the client image-block cache.

In operations not illustrated in FIG. 2, the client main processor 210 copies the image blocks required for the current view, cropped to the boundary of the current view, into the client computer system's display buffer 222, whereupon they are immediately visible in display 208. In various preferred embodiments of the present invention the requisite image blocks may be copied into display buffer 208 in various orders. One embodiment does the following. After step 304, in which the locally-resident relevant image blocks are identified, each is copied into display buffer 222. Then, subsequently, as relevant image blocks are received from they server, they too are copied to display buffer 222, either before or after being added to the cache. Another embodiment is like the preceding with the additional feature that immediately after the client issues request 306 to the server for a residual image block, it copies into display buffer 222 a temporary, imperfect stand-in for the missing image block, constructed by replicating pixels from the highest-resolution lower-resolution cached image blocks that intersect the residual area. When the actual image block required is later received, the operation of copying it into display buffer 222 overwrites and erases this temporary copy.

FIGS. 3 to 7 show in more detail the operations of the cache examination step 302 and image-block request step 306, in which image-blocks not-resident in the cache are identified and requested from the server.

Figure 3:
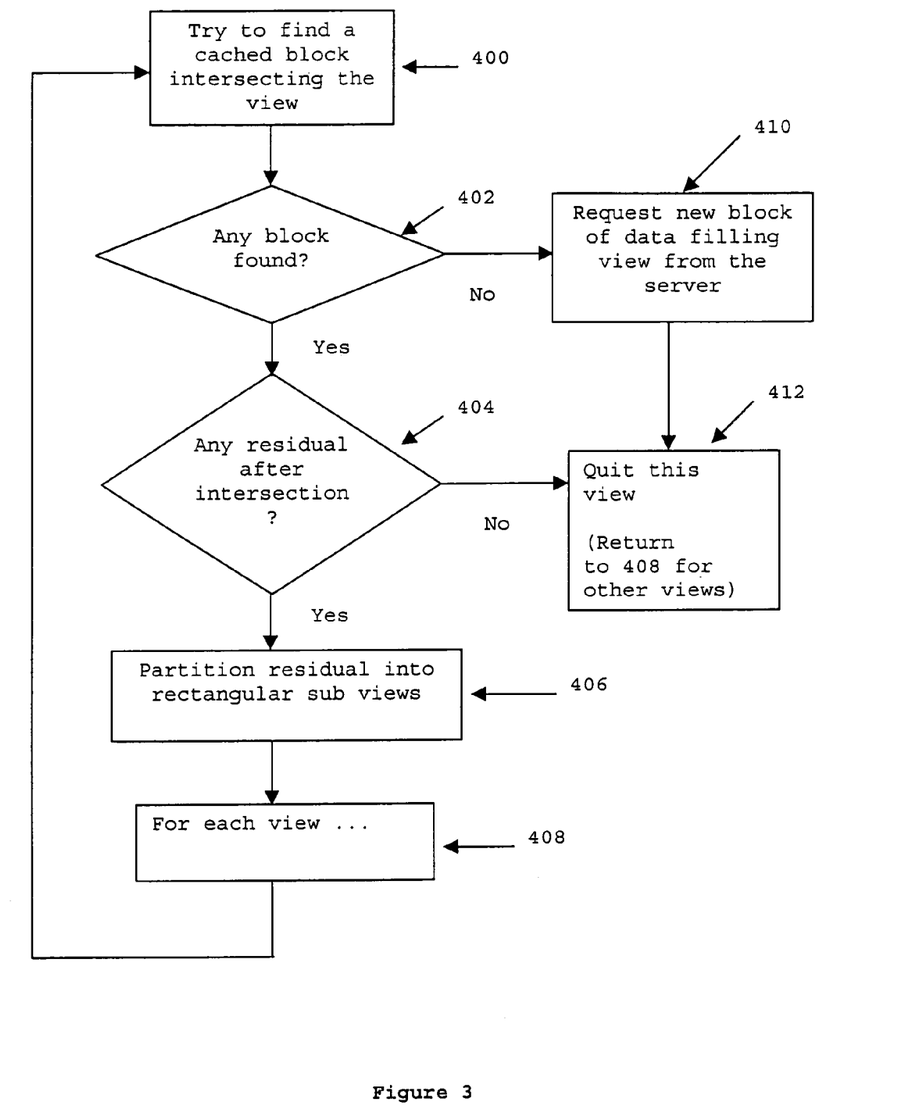
FIG. 3 illustrates the detailed operation of the cache examination and image-block request steps of FIG. 2.
Figure 4:
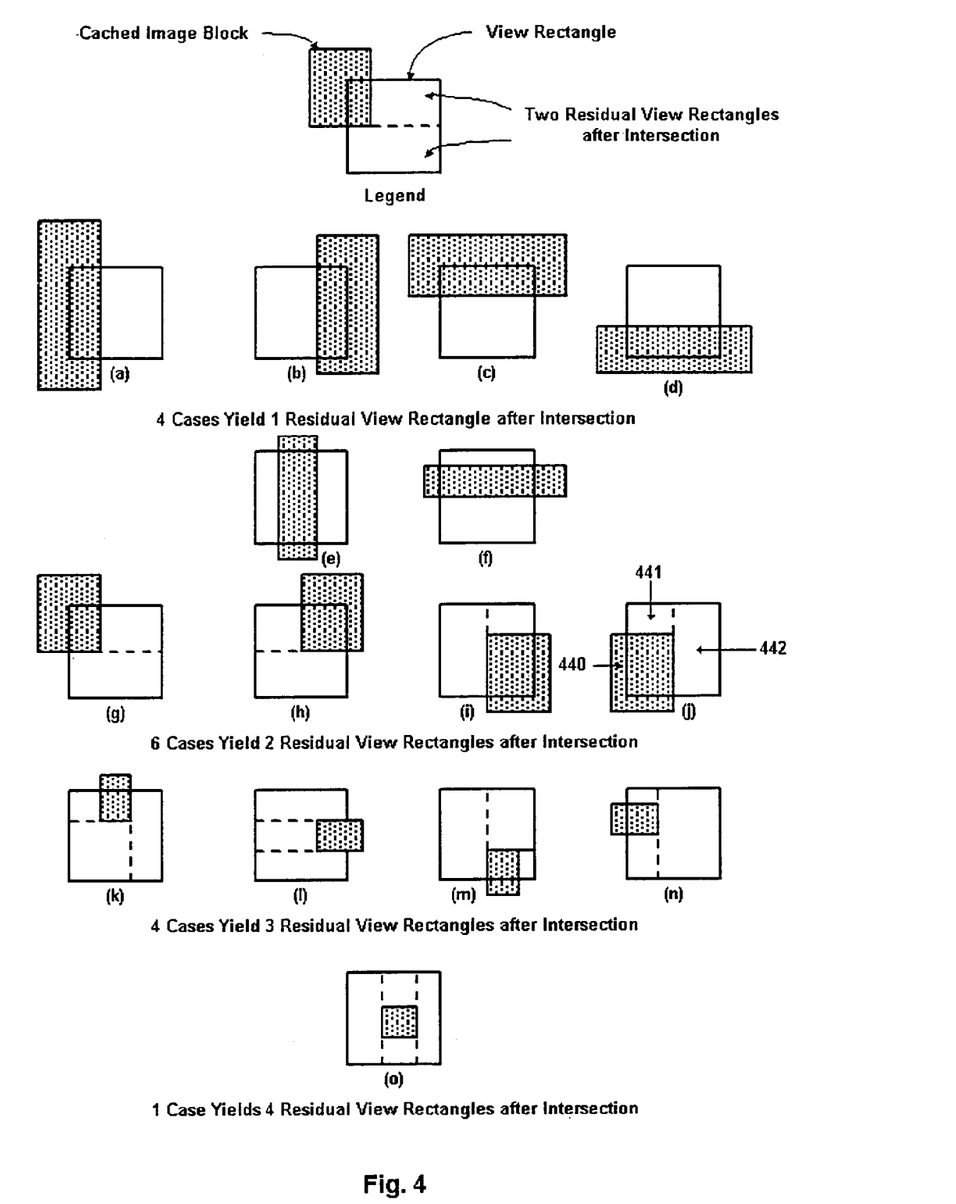
FIG. 4 illustrates the configurations that are possible in the partitioning step of FIG. 3.
Figure 5:
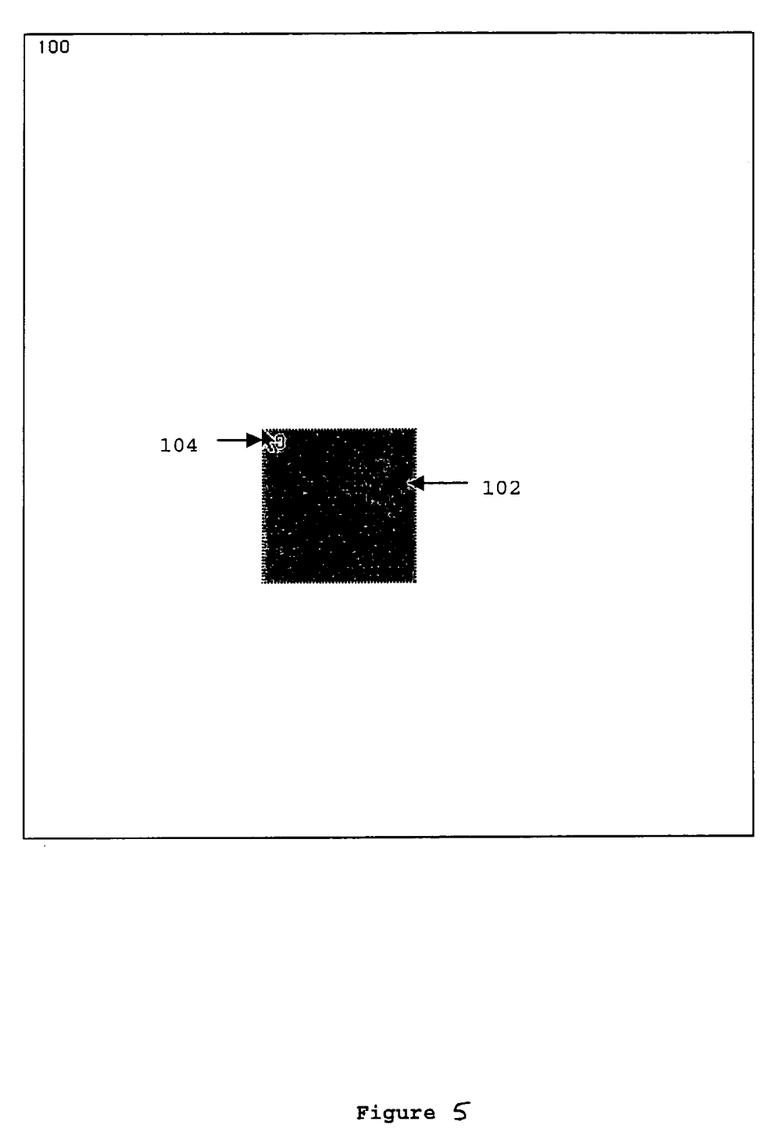
FIG. 5 illustrates a view window into a larger image, showing the spatial organization of image blocks in the client computer's cache at the beginning of a viewing session.
Figure 6:
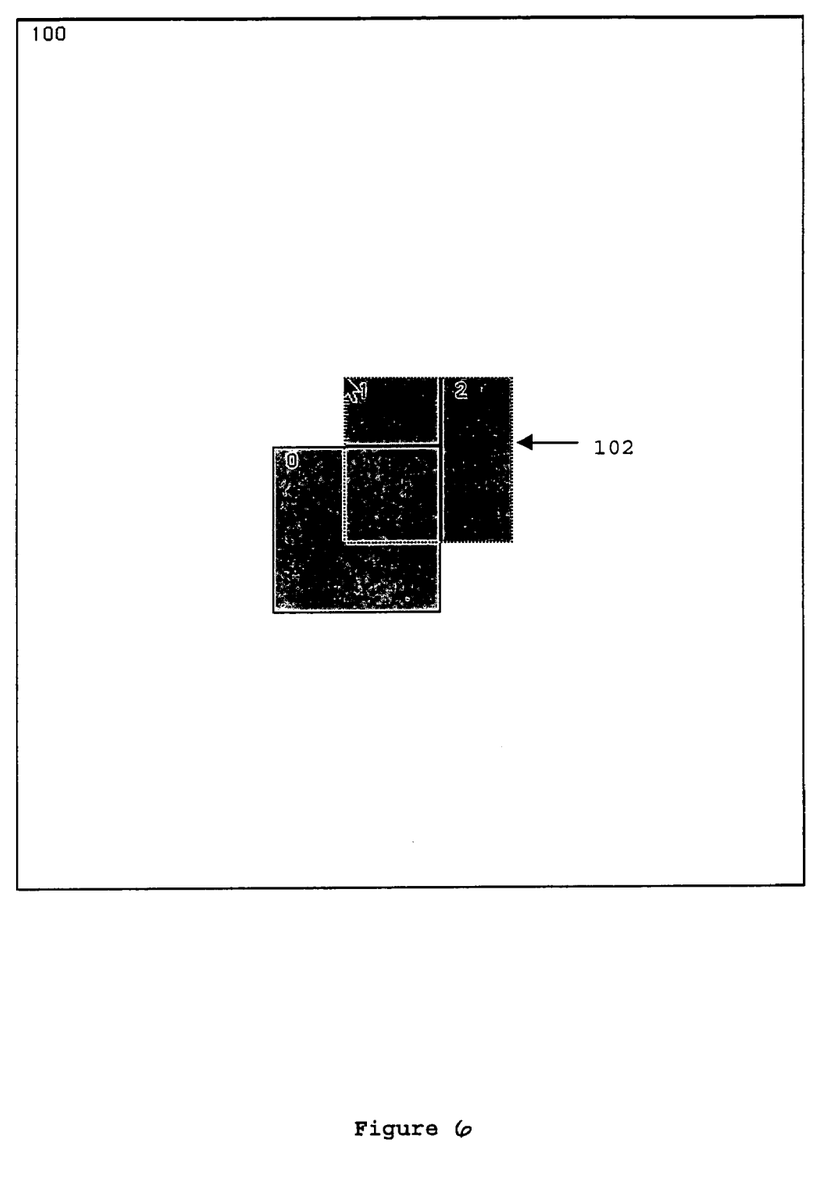
FIG. 6 shows the same viewing session as in FIG. 5 after one panning operation subsequent to the first view.
Figure 7:
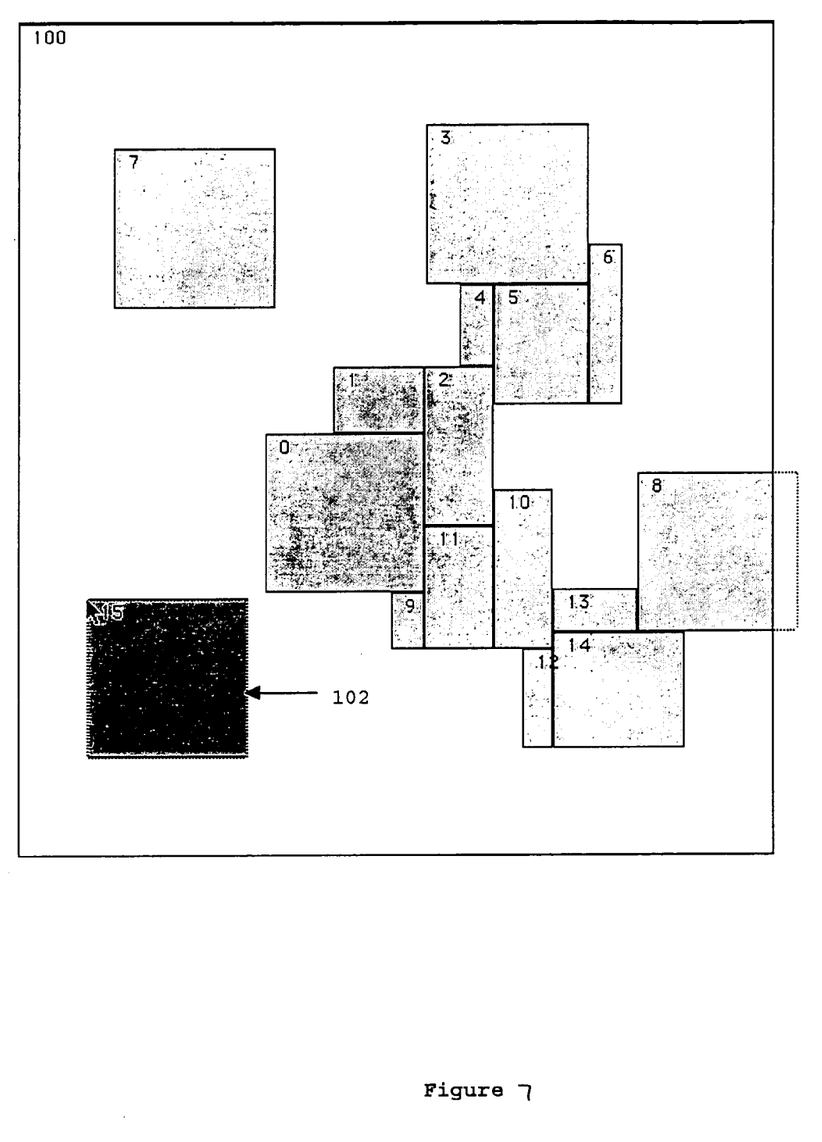
FIG. 7 shows the same viewing session as in FIGS. 5 and 2 after eight panning operations subsequent to the first view.

FIG. 3 is a flow-of-control diagram illustrating the operation of cache-examination step 302 and image-block request step 306. FIG. 4 illustrates the partitioning method used at step 406 of FIG. 3. FIGS. 5 through 7 represent a view (102) into an image (100) and show the accumulation of image blocks in the client image-block cache as the view is panned over the image.

In a real panning operation, the rectangular view window remains fixed in position on display 208 and the display changes as if the larger image were moving under the view window, with just a portion of the image viewable through the window. In FIGS. 5 through 7 the opposite is true. Representation 102 of the viewing window is moved over larger image 100 to show what portion of the image is visible at a given point in time. Cursor 104 in FIG. 5, and analogous cursors in FIGS. 6 end 7, are artifices of the computer program used to generate FIGS. 5 through 7. In a real image-panning interactive session, the direction and distance of each pan would most likely be controlled by keyboard arrow keys or by a mouse, with no display of a cursor like 104.

Initially, the user of client system 202 pans view window 102 so that it corresponds to the lower-central part of image 100 shown in FIG. 5.

When the pan position is fixed, cache-examination process 302 begins as illustrated in FIG. 3.

First, at step 400, client main processor 210 tries to find an image block in cache 212 that intersects view 102. Specifically, step 400 consists of (a) finding and identifying the first image block in cache 212 that intersects view 102, if there is any such image block, end (b) reporting the absence of any such image block, if there is no block in the cache that intersects the view 102.

Next, at step 402, client main processor acts differentially depending on whether any such block was found.

The situation illustrated in FIG. 5 is one in which the client image-block cache is empty. Hence the report at step 402 will be that no intersecting block was found.

When no intersecting block is found at step 402, the client main processor then moves to step 410, at which it requests from the server a new block of image data filling the view. In FIG. 5, the block requested at step 410 is block 0.

The client main processor then moves to step 412, at which point it quits processing the current view. In the general situation, although the client main processor has quit processing the current view, it may still have other views to process, for the process of FIG. 3 is potentially recursive, and there may be additional views awaiting processing at step 408. In the particular situation illustrated by FIG. 5, there are no other views awaiting processing at step 408 after block 0 is requested, and the process ends at step 412.

Consider now FIG. 6, which shows a situation after block 0 has been received. Now view window 102 has panned to the upper right from its original position. Consider how the cache examination step 302 proceeds for the situation of FIG. 6.

First, at step 400, the client main processor attempts to find a cached image block intersecting view 102. It succeeds, finding block 0. Hence, at step 402, in response to the query, "Any block found?" the processor reports that yes, block 0 was found.

Next, at step 404, the client main processor asks whether any residual area remained in view 102 after it was intersected with block 0. The answer in this case is yes; the residual area composed of rectangles 1 and 2 in FIG. 6 remains after block 0 is subtracted away from view 102.

Next, at step 406, the client main processor partitions the residual area of the view into a minimum possible number of disjoint non-overlapping rectangular subviews. In the general case, when a first rectangle (the view) is overlapped by a second (the cached image block), and when the area of overlap is subtracted from the first rectangle, the residual area can then be minimally decomposed into between 1 and 4 rectangles. There are fifteen different intersection configurations, illustrated in FIG. 4. The different configurations are characterized by the number and location of points of intersection between the cached image block and the view, and in some cases by additional information. It is apparent from the regularities in the fifteen configurations of FIG. 4 that it is a straightforward task for a skilled computer programmer to program a computer to compute the coordinates of the residual rectangular subview or subviews remaining after intersection of the view with a cached rectangle.

In the case of the intersection of cached block 0 with view 102 in FIG. 6, the minimum decomposition of the residual area is into two contiguous rectangular subviews, corresponding to not-yet-requested blocks 1 and 2. The case shown in FIG. 6 corresponds to case (j) of FIG. 4, with block 0 corresponding to block 440, and residual rectangular subviews 1 and 2 corresponding to subviews 441 and 442, respectively. Notice that there is some latitude in programming the decomposition. Case (j) of FIG. 4 has decomposed the residual area into a full-height segment 442 on the right and a less-than full-width segment 441 on the top. But it could just as well have been decomposed into a full-width segment on the top, and a less-than full-height segment on the top. A computer can be programmed to make such decomposition decisions arbitrarily and unvaryingly or algorithmically, so to achieve some goal, such as minimum variance in the sizes of the residual rectangles.

Then, at step 408, the client main processor iterates the process that begins at step 400 for each of the new views generated as subviews at step 406.

In the particular case illustrated in FIG. 6, the client main processor first examines at step 400 the subview corresponding to block 1. It tries to find a cached image block intersecting this view. It finds no such intersecting block, whereupon it moves to step 410 and requests from the server a new block of image data, block 1, filling the view. Thereafter, the system moves to step 412, wherein it quits processing the view coinciding to block 1, and returns to step 408 to process any views remaining in the queue. In this case, one unprocessed view remains at step 408, the view whose area corresponds to not-yet-requested block 2. The processor tries, and fails, at step 400, to find a cached image block intersecting the view whose area corresponds to not-yet-requested view 2. Hence it moves to step 410, whereupon it requests from the server new block 2, filling the view. The processor then moves to step 412 whereupon it stops processing the view corresponding to view 2. The processor then asks whether any more views remain to be processed at step 408. The answer in this case is no, so the cache examination and request process illustrated in FIG. 3 terminates.

It is well known in the art of computer programming to implement a schema such as the one described above and illustrated in FIGS. 3 through 7 by a subroutine that calls itself recursively. The microfiche appended to the present patent document contains a set of subroutines (written in the C++ programming language to run on an Apple Macintosh computer) that carry out the sequence of operations described above by means of recursive calls to a procedure IntersectBox1, corresponding to step 400 of FIG. 3.

At the end of the second pan operation, as shown in FIG. 6, the client image block cache contains three cached blocks, one of which, block 0, is the full view size, and two of which, blocks 1 and 2, are fragments of the full view size.

FIG. 7 shows the contents of the image-block cache after nine panning operations. The third pan brings in block 3. The fourth pan brings in blocks 4, 5 and 6. The fifth pan brings in block 7. The sixth pan brings in block 8. The seventh pan brings in blocks 9, 10 and 11. The eighth pan brings in blocks 12, 13 and 14. The ninth pan brings in block 15.

Whenever a pan lands on an empty area, only one image block, comprising exactly the pixels needed for the current view, is requested from the server and transmitted back to the client. Hence the amount of block-header messaging traffic from the server to the client is absolutely minimized. This is true of the pans that result in the requesting of blocks 0, 3, 7, 8 and 15.

When the area of a view intersects the boundary of the image, the image block requested from the server is clamped to the edge of the image. This is true of block 8. The position of the image view, overlapping the image boundary, is shown by a dotted line around block 8 in FIG. 7.

This completes the description of a first preferred embodiment of the present invention. A second preferred embodiment requires some discussion.

In the case of the first preferred embodiment, as illustrated in FIGS. 5 through 7, the set of pixels comprising the image blocks transmitted from the server to permit the display of a particular image view comprises exactly those pixels which are needed for the view but missing from the client image-block cache. No superfluous pixels—additional beyond those needed for the display of the current view—are ever transmitted. There is no pixel padding, as there is in the case of prior-art uniform-tile client-server digital-image viewing systems.

However, in case the image resident on the server is compressed and it is desired to retain the transmitted image portions in their compressed form as they are transmitted from the server to the client, it may be impossible to avoid some padding, and hence some transmission of superfluous pixels.

For example, it is common under Joint Photographic Experts Group (JPEG) compression schemes to compress images into 16 pixel by 16 pixel compressed squares, and each of these squares must be maintained intact between compression and decompression in order for the compression-decompression process to work correctly.

A second embodiment of the invention is designed to work with JPEG-compressed image files resident on the server, or with images that have been compressed under other schemas that encode the image into a grid of uniformly-sized rectangles. In the second embodiment, the image is thought of as being uniformly tiled with a grid of the size of the compression blocks. For example, if the compression unit is 16 rows by 16 columns, the tile grid would include pixel rows 0 through 15 in tile row 1, pixels 16 through 31 in tile row 2, and so forth. The actual view (102 in FIGS. 5 through 7), is now supplemented by a virtual view constructed as the smallest view-enveloping rectangle that corresponds exactly to a rectangular array of compression-grid tiles. Step 400 of FIG. 3 is then decomposed into the following two substeps: (400*a*) Find the virtual view, defined as the minimum enveloping view corresponding exactly to a rectangular array of compression-grid tiles; (400*b*) try to find a cached image block intersecting the virtual view.

The modification described above will cause the dimensions of all image blocks requested from the server to correspond exactly to a rectangular array of compression-grid tiles. Each such array is then transmitted in its compressed form from the server to the client. On receipt of each such array of compression-grid squares, the client decompresses them into an image-block which is then inserted into the client's image block cache 212. In this second preferred embodiment, the client may contain, in addition to the image-block cache, a cache containing the compressed image blocks, as they were received from the server. The existence of this secondary cache gives the client an intermediate strategy at cache cleanup time, intermediate in severity between removing an image block from all client caches and retaining it in the principal image-block cache. When the principal image-block cache hits its memory limit, the client may purge a set of image blocks from the principal cache while retaining the analogous compressed image blocks in the secondary compressed cache. In this manner, if the client finds it needs the decompressed image blocks again it can regenerate them from the compressed cache without having to go back to the server for them.

This completes the detailed description of preferred embodiments. It will be apparent to those skilled in the art, however, that the invention is not limited to these preferred embodiments, but includes other evident combinations, instantiations and extensions. In particular and for example, in the preferred embodiments described above, each of non-uniformly-sized rectangular image blocks requested by the client computer from the server computer is assigned the largest size possible given the client computer's imaging needs. It may be desirable, for reasons of transmission and caching efficiency, to place an upper bound on the size of the image blocks requested by the client. The client then requests the largest image block possible subject to this upper bound. It may also be desirable, for reasons of transmission or caching efficiency, to insist that the image blocks requested by the client have boundaries that correspond to byte boundaries or word boundaries or other particular boundaries in the server's digital memory. For this reason, the actual view (102 in FIGS. 4 through 6), may be supplemented by a virtual view constructed as the smallest view-enveloping rectangle with boundary positions exactly divisible by 8 or 16 or other number. The system's methodology for computing tile requests is then analogous to the methodology it uses for requesting compression-grit tiles, as described above.

A number of schemas will be evident to those skilled in the art for increasing the speed of operation of step 400, which consists of trying to find an image block in the cache intersecting a given view. Such schemes include notably maintaining the image blocks in linked lists according to the horizontal and vertical coordinates of their corners, and maintaining arrays of pointers from a regular grid of image cells, or from the rows and columns of the image, to all intersecting image blocks. In other variant embodiments, for example, the image blocks requested from the server and delivered to the client need not be restricted to rectangles, but may include more complex shapes. An embodiment can be constructed in which the image blocks are any shape that may result from an agglomeration of rectangles. In this case, the amount of network traffic required to deliver the pixels required for a view is further reduced, since all pixels required for any view are sent in one packet with one header. In this embodiment, however, the cache-examination step 402 comprising finding relevant cache-resident image blocks and identifying the image-block residual becomes computationally more difficult and hence more time consuming.

What is claimed is:

1. A method for communicating a digital image over a network, comprising the steps of:

storing a digital image on a server computer;

maintaining on a client computer stored image blocks comprising portions of said digital image that have been downloaded from the server computer to the client computer;

in response to a request by a user of the client computer for a given view, comprising a particular image portion at a given resolution, performing the steps of computing the residual area of the view resulting from subtracting out from the view the intersecting portions of stored image blocks, and, if the residual area is positive, downloading from the server computer the residual portion of the view at the given resolution;

partitioning the residual portion of the view into the minimum possible number of rectangles and downloading these rectangles from the server computer, wherein the operation of partitioning the residual portion of the view into the minimum possible number of rectangles comprises recursively executing, for the initial view and each subsequent subview, a procedure that tries to find a first stored image-block intersecting the view, and, if one is found, partitions the residual area of the view into the minimum possible number of rectangular subviews, and, if none is found, treats the entire view as a rectangle to be downloaded from the server computer.

2. A method according to claim 1, further comprising the step of displaying the given view to the user.

3. A method according to claim 1, further comprising the step of placing the downloaded image portion in the client computer's image-block cache.

4. A method according to claim 3, further comprising the step of selectively removing items from the client computer's image-block cache when the size of the cache reaches a limit.

* * * * *